United States Patent Office 2,814,655
Patented Nov. 26, 1957

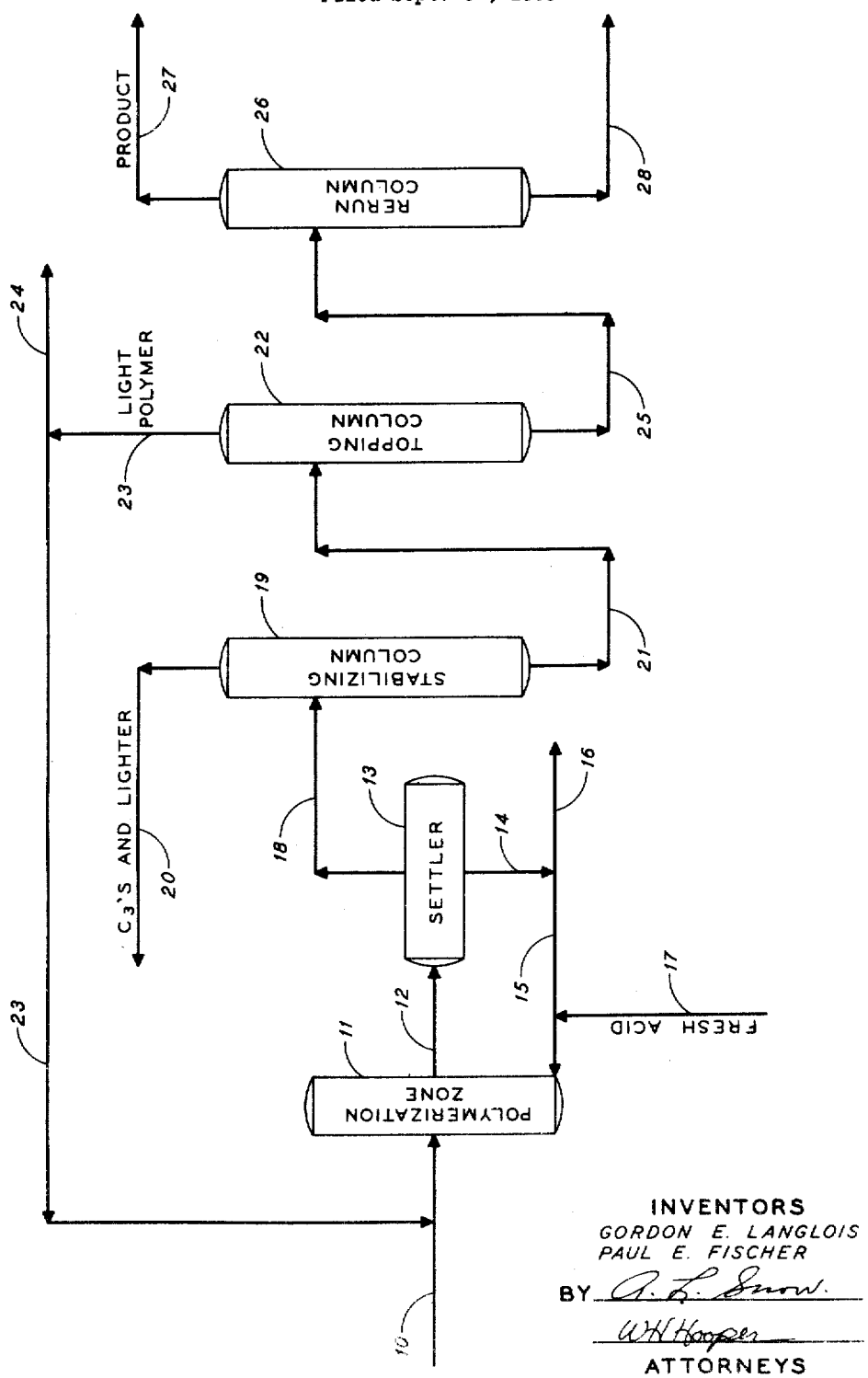

2,814,655

PROCESS FOR THE PRODUCTION OF HIGH BOILING PROPYLENE POLYMERS EMPLOYING LIQUID PHOSPHORIC ACID CATALYST

Gordon E. Langlois, El Cerrito, and Paul E. Fischer, Concord, Calif., assignors to California Research Corporation, San Francisco, Calif., a corporation of Delaware Application September 30, 1955, Serial No. 537,715

4 Claims. (Cl. 260—683.15)

This invention relates to a process for the production of propylene polymers by the polymerization of propylene in the presence of a liquid phosphoric acid catalyst and, more particularly, to a process for producing high yields of propylene polymers boiling predominantly in the range of about 425° to 650° F.

Propylene polymer fractions boiling in the range of from about 340° to 420° F., and which are termed "propylene tetramer polymers" in the art, have heretofore been used to a considerable extent as alkylating agents in the production of alkylated aromatic hydrocarbons particularly valuable as starting materials in the production of detergents. However, the detergent produced from such tetramer alkylate has been found to be unsatisfactory in several respects, such as in poor foaming characteristics and excessive caking, and in order to overcome these defects it has been necessary to employ expensive additives. Accordingly, it is an object of the present invention to provide a process for the polymerization of propylene to produce a polymer which, when employed as the alkylating agent in the production of such detergents, provides a product having superior detergency qualities and which does not require the inclusion of such additives.

A further and more particular object is to provide a process whereby propylene is polymerized in the presence of liquid phosphoric acid to produce a propylene polymer boiling predominantly in the range of from about 425° to 650° F. Other objects and advantages of the invention will become apparent from the following detailed description thereof.

According to the present process, a body of liquid phosphoric acid having a concentration of from about 117% to 112% (calculated as ortho-phosphoric acid) is maintained in a reaction zone at a temperature of from about 175° to 300° F. and a pressure of from about 200 to 1800 p. s. i. g. Into this reaction zone is passed a liquefied normally gaseous hydrocarbon material comprising a substantial proportion of propylene at a space velocity of from about 0.1 to 5.0 v./v./hr. (volumes of liquid propylene, per volume of acid, per hour). The resulting effluent, or reaction product, is found to be made up in major portion of a propylene polymer boiling predominantly in the range of from about 425° to 650° F. The normally minor percentage of propylene polymer boiling below about 425° F. is preferably recycled to the reaction zone for conversion to the desired higher boiling polymer.

The process of the invention may be readily understood by reference to the appended drawing, wherein the single figure is a diagrammatic illustration of a process flow suitable for the practice of the present invention. No attempt is made in the drawing to include all of the necessary control equipment, condensers, and the like, since the location thereof can readily be supplied by those skilled in the art.

Referring now to the drawing, a feed (previously treated, if desired, to remove polar bodies, followed by drying to remove any water present) consisting of propylene or a substantial proportion of propylene is continuously passed in the liquid phase through line 10 into polymerization reaction zone 11 at a space velocity of from about 0.1 to 5.0 v./v./hr. In reactor 11 the feed is contacted with a body of liquid phosphoric acid having a concentration of from about 117% to 122%, calculated as ortho-phosphoric acid, at a temperature of from about 175° to 300° F. and a pressure of from about 200 to 1800 p. s. i. g. Reactor 11, while illustrated as a conventional reaction vessel, may be any type of apparatus wherein there is sufficient contact time between the feed and the acid under the process conditions for the desired olefin conversion, and may be a stirred vessel, pump, section of pipe, etc., or any combination thereof. In this connection, it must be borne in mind that the phosphoric acid catalyst employed in the subject process (117% to 122% $H_3PO_4$) is one of extremely complex molecular structure which gives rise to several problems. For convenience, it has been conventional in the art to designate mixtures of phosphoric acids more concentrated than ortho-phosphoric acid in terms of their ortho-equivalent, as, for example, 106% or 112% $H_3PO_4$. However, in the higher concentration regions, this scale becomes somewhat misleading in that rather small changes in percent $H_3PO_4$ correspond to large changes in the molecular structure of the acid. For example, 114% $H_3PO_4$ has a molecular weight in the neighborhood of 265, while 117% $H_3PO_4$ and 119% $H_3PO_4$ have molecular weights of about 425 and 650, respectively. Likewise, as the molecular weight increases rapidly, so does the viscosity. Thus, at 70° F., 114% $H_3PO_4$ has a viscosity of about 29,000 centipoises, whereas 117% and 119% $H_3PO_4$ have viscosities of about 110,000 and 280,000 centipoises, respectively. It can be seen, therefore, that the present process, by employing a liquid phosphoric acid concentration of from about 117% to 122% $H_3PO_4$, uses as a catalyst a material that differs considerably from the lower concentration phosphoric acids described in prior teachings. Furthermore, at normal room temperature, these high concentration acids are extremely viscous and often exist in essentially solid form. Therefore, in order to employ them in a liquid form so as to obtain the maximum catalytic value, the equipment (reactors, storage vessels, lines, and the like) must be kept heated (as by steam tracing, and the like) at all times. Failure to do so allows the acid to "set up," resulting in the plugging of equipment.

Following the contacting step, the reaction mixture is continuously withdrawn from reactor 11 by line 12 and passed into separation zone (settler) 13, wherein an upper hydrocarbon layer or phase and a lower acid phase are formed. The acid phase is withdrawn from the settler by lines 14 and 15 and returned as recycle to reactor 11. Partially spent acid can be removed from the system by line 16 and fresh make-up acid introduced into the recycle acid stream in line 15 by line 17. We prefer that the make-up acid entering by line 17 be of a higher concentration than that employed in the reaction zone, since the presence of any water in the feed will of course lower the concentration of the acid in the polymerization reactor 11. Thus, by merely injecting higher concentration acid into the recycle acid, any water present in the feed can easily be compensated for without a loss of critical catalyst concentration.

The upper hydrocarbon layer is passed from settler 13 by line 18 to stabilizing column 19 wherein all of the $C_3$'s (including small amounts of unreacted propylene) and lighter components of the hydrocarbon phase are distilled overhead through line 20 to storage or other facilities. The remaining hydrocarbons, consisting essentially of propylene polymers, are removed from the stabilizer 19 by line 21 and passed into a second distillation column 22, conventionally termed a topping still. An overhead fraction, composed predominantly of light propylene polymers boiling below about 425° F. is removed from the topping still by line 23 and at least a portion of it is preferably recycled by that line to line 10, wherein it is admixed with the propylene-containing feed passing into polymerization zone 11. We have found that, in general, recycle of at least a portion of this light polymer increases the yield of propylene polymer boiling above about 425° F. Light polymer can be removed from the system by line 24. If desired, the light propylene polymer in line 23 can be passed to other distillation equipment for recovery of specific fractions, such as the so-called "tetramer" or lighter polymers. A bottoms fraction, composed predominantly of propylene polymers boiling from about 425° to 650° F., is removed from column 22 by line 25 and passed in a third distillation column 26, herein referred to as a rerun still. An overhead fraction, consisting essentially of propylene polymers boiling above about 425° F., is removed from still 26 as the desired product by line 27.

As noted above, the desired propylene polymer product recovered from the system by line 27 has an initial boiling point of about 425° F. This product can, in turn, be further processed, as by distillation, to recover specific high boiling polymer fractions. For example, the above process flow can produce a pentamer polymer fraction that, when employed in detergent manufacture, produces a superior product necessitating no addition of foam-improving or anti-sticking agents. By the term "pentamer polymer fraction" is meant a propylene polymer fraction having the following general fractional distillation points:

5% T. B. P_____° F__ 435 to 450
95% T. B. P_____° F__ 500 to 520

Such a fraction contains relatively large amounts of polymers containing 15 carbon atoms per molecule (thus, the term "pentamer"), but it must be understood that such a fraction is a complex mixture of hydrocarbons that will generally contain, in addition to the pentamer, minor amounts of molecules containing from 12 to 17 or so carbon atoms per molecule. If such a fraction is desired, it is obvious that the rerun column 26 can be operated so that only the pentamer fraction is taken overhead by line 27, with the heavier polymers produced in the polymerization reaction being withdrawn as a bottoms by line 28. On the other hand, if a product of a higher boiling range than that of the pentamer is desired, the rerun still can simply be operated to recover such a polymer fraction.

The advantages of employing the process of the present invention in producing a propylene pentamer polymer fraction is shown in Table I. In the table, three separate runs are summarized. One run (run No. 1), conducted in the presence of liquid phosphoric acid of a concentration (114% $H_3PO_4$) outside the concentration range of the subject process (117% to 122% $H_3PO_4$), is tabulated for comparative purposes only, while runs 2 and 3 show the effects of operating according to the present invention. In all of the runs, normally gaseous hydrocarbons consisting essentially of propylene were liquefied and introduced in the liquid-phase into a body of liquid phosphoric acid. Light polymer recycle (boiling below about 425° F.) was also introduced into the reactor in an amount equivalent to 5 volume per volume of propylene. The acid and hydrocarbons were vigorously mixed and the reaction product separated into an acid and a hydrocarbon phase. The hydrocarbon phase was stabilized and passed to the topping column. Part of the overhead from the topping column was recycled and the remainder, plus the topping column bottoms, constituted the net product. The latter was then inspected to determine the amount of pentamer polymer fraction [defined for purposes of these runs as a polymer fraction with a T. B. P. (True Boiling Point) 5% point of 447° F. and T. B .P. 95% point of 513° F.] produced in the polymerization reaction. All acid concentrations indicated are expressed as weight percent ortho-phosphoric acid; the values are obtained by titrating a weighed sample of the acid catalyst, calculating its equivalent weight of ortho-phosphoric acid and dividing this equivalent weight by the weight of the sample. All space velocities are expressed as volumes of liquid propylene per volume of catalyst per hour (v./v./hr.).

*Table 1*

| Run number | 1 | 2 | 3 |
|---|---|---|---|
| Operating conditions: | | | |
| Temperature, ° F | 225 | 225 | 225 |
| Pressure, p. s. i. g | 700 | 700 | 700 |
| Average space rate, v./v./hr | 1.42 | 2.04 | 2.43 |
| Catalyst concentration, percent $H_3PO_4$ | 114 | 117 | 119 |
| Light polymer recycle ratio, vol. polymer/vol. propylene | 5 | 5 | 5 |
| Propylene conversion to polymer, weight percent | 80 | 80 | 80 |
| Propylene pentamer polymer produced: Wt. percent of propylene reacting | 15 | 51 | 77.5 |
| Total propylene polymer boiling from 425° to 650° F.: Wt. percent of propylene reacting | 17 | 59 | 97 |

From the above tabulated data it can be seen that when the reaction temperature, pressure, light polymer recycle ratio, and propylene conversion are all kept constant, the amount of propylene pentamer polymer produced when employing 117% and, particularly, 119% $H_3PO_4$, is considerably higher than when 114% $H_3PO_4$ is employed. Thus, the run employing 117% $H_3PO_4$ produces almost 3.5 times as much pentamer as when 114% acid is used, and the 119% $H_3PO_4$ case produces over five times as much. Likewise, it can be seen that when 117% acid is employed, about 3.5 times as much polymer boiling in the range of from 425° to 650° F. is produced than when using 114% $H_3PO_4$. When 119% acid is employed, 97 weight percent of the polymer produced boils in the 425° to 650° F. range, over 5.7 times as much as the polymer produced in the 114% $H_3PO_4$ reaction.

We claim:

1. A process for producing propylene polymers boiling predominantly in the range of from about 425° to 650° F. from a propylene-containing, liquefied, normally gaseous hydrocarbon feed, which comprises intimately contacting said hydrocarbon feed at a space velocity of from about 0.1 to 5.0 v./v./hr. with a body of liquid phosphoric acid having a concentration of from about 117% to 122% ortho-phosphoric acid at a temperature of from about 175° to 300° F. and a pressure of from about 200 to 1800 p. s. i. g.

2. The process of claim 1, wherein the hydrocarbon feed contains propylene and propylene polymers boiling below about 425° F.

3. A continuous process for the production of a propylene pentamer polymer fraction, which comprises maintaining a body of liquid phosphoric acid having a concentration of from about 117% to 122% ortho-phosphoric acid in a polymerization zone at a temperature of from about 175° to 300° F. and a pressure of from about 200 to 1800 p. s. i. g.; intimately contacting a liquid feed containing a substantial proportion of propylene with the acid in said zone by passing the feed through the acid at a v./v./hr. of from about 0.1 to 5.0; continuously withdrawing a reaction mixture from said polymerization zone and passing said mixture to a settling zone; withdrawing an upper hydrocarbon layer from said settling zone and passing it to at least one fractional distillation zone; recovering from said distillation zone a propylene pentamer polymer fraction as a product; and continuously returning at least a portion of a lower acid layer from said settling zone to said polymerization zone.

4. The process of claim 3, wherein a light propylene polymer fraction boiling below the propylene pentamer polymer fraction is recovered from said distillation zone and is returned to the polymerization zone.

References Cited in the file of this patent
UNITED STATES PATENTS 2,592,428  Kemp et al. _____ Apr. 8, 1952

U. S. DEPARTMENT OF COMMERCE
PATENT OFFICE

CERTIFICATE OF CORRECTION

Patent No. 2,814,655                            November 26, 1957

Gordon E. Langlois et al.

It is hereby certified that error appears in the printed specification of the above numbered patent requiring correction and that the said Letters Patent should read as corrected below.

Column 1, line 48, for "112%" read --122%--.

Signed and sealed this 25th day of February 1958.

(SEAL)
Attest:

KARL H. AXLINE

Attesting Officer                                     ROBERT C. WATSON
                                                               Commissioner of Patents